United States Patent
Sun et al.

(10) Patent No.: US 10,703,992 B2
(45) Date of Patent: Jul. 7, 2020

(54) PROCESS AND APPARATUS FOR RECOVERING HYDROCRACKED SOFT PITCH

(71) Applicant: UOP LLC, Des Plaines, IL (US)

(72) Inventors: Ping Sun, Riverside, IL (US); Grant H. Yokomizo, Mount Prospect, IL (US); Bart Dziabala, Hickory Hills, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/851,627

(22) Filed: Dec. 21, 2017

(65) Prior Publication Data

US 2019/0194553 A1    Jun. 27, 2019

(51) Int. Cl.
| | | |
|---|---|---|
| *C10G 47/26* | (2006.01) | |
| *C10G 7/00* | (2006.01) | |
| *B01D 3/34* | (2006.01) | |
| *B01F 3/00* | (2006.01) | |
| *B01D 3/14* | (2006.01) | |
| *B01D 3/40* | (2006.01) | |

(52) U.S. Cl.
CPC .............. *C10G 47/26* (2013.01); *B01D 3/143* (2013.01); *B01D 3/34* (2013.01); *B01D 3/346* (2013.01); *B01D 3/40* (2013.01); *B01F 3/00* (2013.01); *C10G 7/00* (2013.01); *C10G 2300/4081* (2013.01)

(58) Field of Classification Search
CPC ................................................... C10G 47/26; C10G 2300/4081; C10G 67/04; C10G 67/0445; C10G 67/0454
See application file for complete search history.

(56) References Cited

U.S. PATENT DOCUMENTS

| | | |
|---|---|---|
| 5,474,977 A | 12/1995 | Gatsis |
| 5,755,955 A | 5/1998 | Benham et al. |
| 6,004,453 A | 12/1999 | Benham et al. |
| 7,981,277 B2 | 7/2011 | Subramanian et al. |
| 8,110,090 B2 | 2/2012 | Zimmerman et al. |
| 8,231,775 B2 | 7/2012 | McGehee et al. |
| 8,540,870 B2 | 9/2013 | McGehee et al. |
| 8,691,080 B2 | 4/2014 | Haizmann |
| 9,074,143 B2 | 7/2015 | McGehee et al. |
| 9,127,216 B2 | 9/2015 | Govindhakannan et al. |
| 9,284,499 B2 | 3/2016 | Van et al. |
| 2003/0089636 A1 | 5/2003 | Marchionna et al. |

(Continued)

OTHER PUBLICATIONS

Leu et. al, An Overview of Solid-Liquid Separation in Coal Liquefaction Processes, Powder Technology, 40 (1984), p. 65-80.

(Continued)

*Primary Examiner* — Michelle Stein
(74) *Attorney, Agent, or Firm* — Paschall & Associates, LLC; James C. Paschall

(57) ABSTRACT

Settling unconverted pitch from a SHC reactor effluent before fractionation improves efficiency of fractionation of slurry hydrocracked products. The recycle of soft pitch to the SHC reactor results in improved reactor operation by avoiding the recycle of lighter products which vaporize in the reactor to occupy reactor space and the recycle of hard pitch which will not convert. The settling step facilitated by mixing with a solvent can achieve a separation between soft pitch and hard pitch not achievable in a fractionation column.

14 Claims, 1 Drawing Sheet

(56) References Cited

U.S. PATENT DOCUMENTS

| | | |
|---|---|---|
| 2009/0127161 A1 | 5/2009 | Haizmann et al. |
| 2010/0122934 A1 | 5/2010 | Haizmann et al. |
| 2010/0248946 A1 | 9/2010 | Bauer et al. |
| 2011/0303580 A1 | 12/2011 | Haizmann |
| 2011/0306490 A1 | 12/2011 | Bhattacharyya et al. |
| 2014/0332442 A1* | 11/2014 | Govindhakannan ... C10G 47/26 208/45 |
| 2016/0097006 A1 | 4/2016 | Macris |
| 2016/0130511 A1 | 5/2016 | Govindhakannan et al. |
| 2017/0128929 A1* | 5/2017 | Kumar .................. C10G 47/02 |

OTHER PUBLICATIONS

Pfeiffer et. al., Asphaltic Bitumen as Colloid System, Phys. Chem. 44, 139 (1940).
Heithaus, Journal of the Institute of Petroleum, 45, 48 (1962).

* cited by examiner

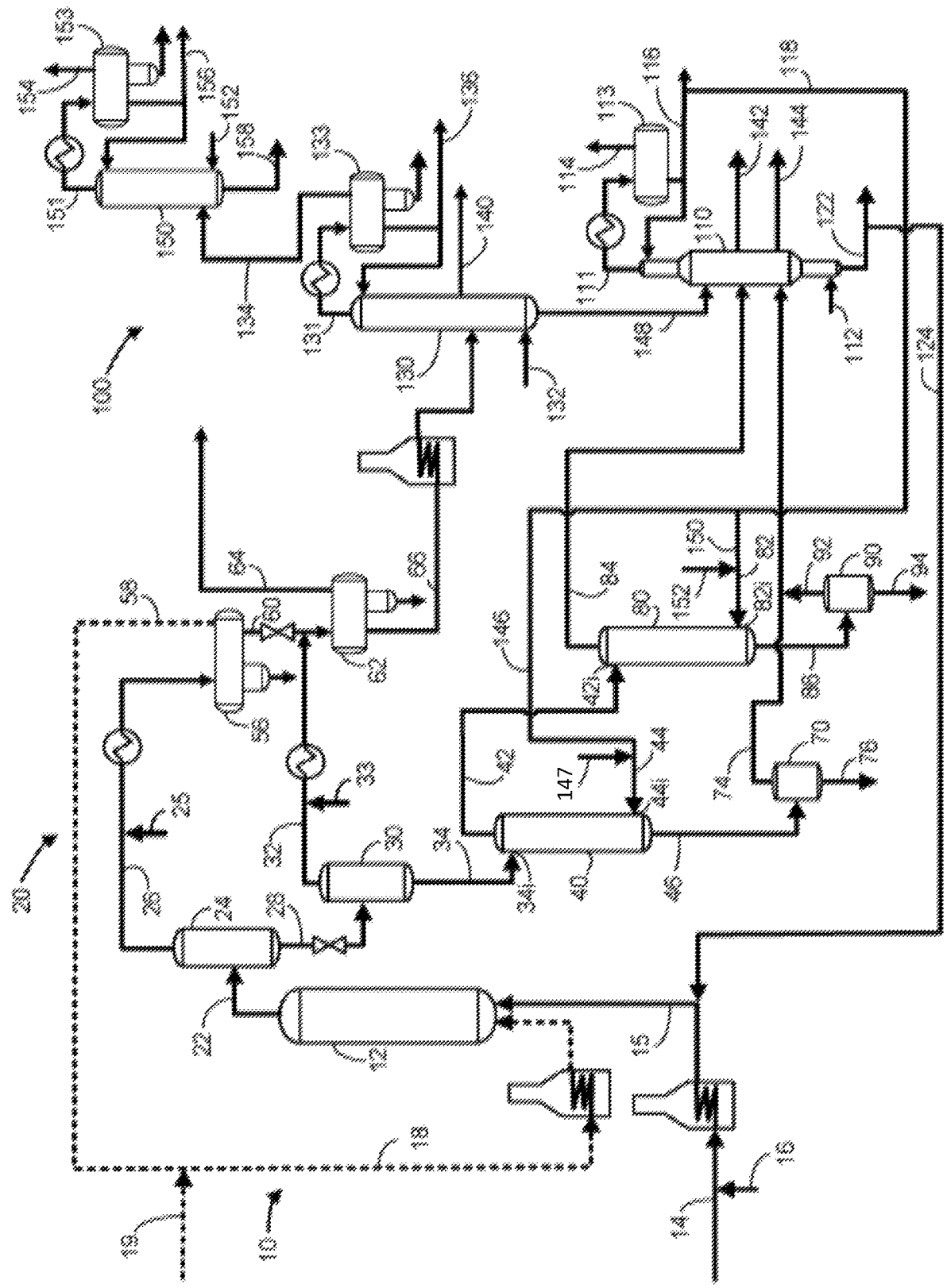

PROCESS AND APPARATUS FOR RECOVERING HYDROCRACKED SOFT PITCH

FIELD

The field is slurry hydrocracking and the recovery of a product streams from a slurry hydrocracked hydrocarbon stream.

BACKGROUND

Slurry hydrocracking (SHC) is a slurried catalytic process used to crack residue feeds to gas oils and fuels. SHC is used for the primary upgrading of heavy hydrocarbon feed stocks obtained from the distillation of crude oil, including hydrocarbon residues or its mixture with gas oils from atmospheric distillation tower bottoms or vacuum distillation tower bottoms. Alternative sources of heavy hydrocarbon feed stocks include solvent deasphalted pitch or visbroken residues. In slurry hydrocracking, these liquid feed stocks are mixed with hydrogen and solid catalyst particles, e.g., as a particulate metallic compound such as a metal sulfide, to provide a slurry phase. Slurry hydrocracked effluent exits the slurry hydrocracking reactor at very high temperatures around 400° C. (752° F.) to 500° C. (932° F.). Representative SHC processes are described, for example, in U.S. Pat. Nos. 5,755,955 and 5,474,977.

During an SHC reaction, it is important to minimize coking. It has been shown by the model of Pfeiffer and Saal, PHYS. CHEM. 44, 139 (1940), that asphaltenes are surrounded by a layer of resins, or polar aromatics which stabilize them in colloidal suspension. In the absence of polar aromatics, or if polar aromatics are diluted by paraffinic molecules or are converted to lighter paraffinic and aromatic materials, these asphaltenes can self-associate to form aggregates, thus forming larger molecules in a separate liquid phase, generate mesophase and form coke.

A fraction of SHC product that is not dissolved by toluene include catalyst and toluene insoluble organic residue (TIOR). TIOR includes coke and mesophase and is heavier in density and less soluble than asphaltenes which are soluble in toluene but not heptane. Mesophase formation is a critical reaction constraint in slurry hydrocracking reactions. Mesophase is a carbonaceous, liquid-crystal material defined as anisotropic particles present in pitch boiling above 524° C. The presence of mesophase can serve as a warning that excessive coke formation is likely to occur under prevailing conditions.

Coking can be minimized by the use of an additive or controlled by lowering reaction temperature. However, at lower temperature, more reactor volume is required to convert feeds with lower reactivity. Adding a polar aromatic oil to the feedstock of a SHC reactor is effective in reducing the coke formation as described in U.S. Pat. No. 5,755,955. Furthermore, U.S. Pat. No. 6,004,453 describes such SHC processing with recycle of both heavy gas oil and unconverted pitch to enable the operation of the unit at a higher conversion, thus facilitating residue upgrading.

One difficulty with SHC processes is the increased risk of reactor fouling when operating at higher pitch conversion. Pitch recycle can be used to reduce the potential for reactor fouling and is necessary to achieve high pitch conversion.

In a SHC process, separation of pitch from vacuum gas oil (VGO) is typically achieved by a vacuum fractionation column that cooperates with an upstream series of separators, stripper(s) and an atmospheric fractionation column. Atmospheric and vacuum fractionation columns provide streams with specified boiling point ranges that are transported to downstream upgrading units. Other recovered products include naphtha, kerosene and diesel.

SHC products typically require additional heating before delivery to a vacuum fractionation column. To achieve low VGO concentration and high pitch concentration in the vacuum bottom stream, the fractionator feed stream and column vaporization zones require high temperature to make up for losses in vacuum pressure encountered while passing through vacuum packing materials along the height of the column. Packing materials are added to achieve efficient separation of product streams. High temperature increases the risk of severe fouling. Otherwise, poor separation can result in high concentrations of VGO product or even light products in the vacuum column bottoms.

In petroleum processing, a mixture of two or more organic compounds can form second liquid phase or semi-solid deposit upon mixing due to their thermodynamic properties. Such compounds are termed "incompatible". A solvent is incompatible with a hydrocarbon stream when mixing of the two creates a second liquid phase or semi-solid deposit. Such an incompatible solvent is considered a poor solvent for that hydrocarbon compound. A solvent is considered to be a "poor solvent' relative to a hydrocarbon stream due to a number of factors. The solubility parameters of the hydrocarbon stream and the solvent stream play a key role. A general guidance is the lower the solubility parameter of a solvent, the higher tendency for this solvent to behave like a poor solvent upon mixing with a hydrocarbon stream. Poor solvents for slurry hydrocracking products can be good solvents for solvent deasphalting because compounds present in slurry hydrocracked product are more dealkylated than naturally occurring hydrocarbon compounds in oil streams. Intrinsically, the physical properties of all participating compounds of a mixture system determines the compatibility behavior; e.g. dispersion energy, molar volume, carbon number, hydrocarbon type and its polarity. A common procedure measures stability of an oil stream through asphaltene flocculation or precipitation by titrating it with a poor solvent compound. ASTM 6703 and Heithaus, JOURNAL OF THE INSTITUTE OF PETROLEUM, 45, 48 (1962) have described similar techniques commonly used in petroleum processing industry.

There is a continuing need, therefore, for improved processes and apparatuses for upgrading residue feed stocks in slurry hydrocracking and in suppression of mesophase production. Improved apparatuses and processes for recovering products and separation of pitch from VGO are needed for SHC recovery processes.

BRIEF SUMMARY

We have found that separating unconverted pitch from a SHC reactor effluent using a solvent before fractionation improves efficiency of fractionation of slurry hydrocracked products. The process separates the most cracking-resistant hard pitch out and recycles soft pitch to the SHC reactor resulting in improved reactor design and operation, particularly at high pitch conversions. The settling step facilitated by mixing with a solvent can achieve a separation between soft pitch and hard pitch not possibly achievable in a fractionation column.

BRIEF DESCRIPTION OF THE DRAWING

The FIGURE is a simplified process flow diagram.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above about 524° C. (975° F.) AEBP as determined by any standard gas chromatographic simulated distillation method such as ASTM D2887, D6352 or D7169, all of which are used by the petroleum industry.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.).

As used herein, "pitch conversion" means the conversion of materials boiling above 524° C. (975° F.) converting to material boiling at or below 524° C. (975° F.).

As used herein, "vacuum gas oil" means a hydrocarbon material having an IBP of at least about 232° C. (450° F.), a T5 of about 288° C. (550° F.) and about 392° C. (737° F.), typically no more than about 343° C. (650° F.), a T95 between about 510° C. (950° F.) and about 570° C. (1058° F.) and, or an EP of no more than about 626° C. (1158° F.) prepared by vacuum fractionation of atmospheric as determined by any standard gas chromatographic simulated distillation method such as ASTM D2887, D6352 or D7169, all of which are used by the petroleum industry.

As used herein, "atmospheric residue" means a hydrocarbon material having an IBP of at least about 232° C. (450° F.), a T5 of about 288° C. (550° F.) and about 392° C. (737° F.), typically no more than about 343° C. (650° F.), and a T95 between about 510° C. (950° F.) and about 700° C. (1292° F.) obtained from the bottoms of an atmospheric crude distillation column.

As used herein, "vacuum residuum" means the hydrocarbon material boiling with an IBP of at least 500° C. (932° F.) and preferably at least 524° C. (975° F.).

As used herein, the term "heavy vacuum gas oil" means the hydrocarbon material boiling in the range between about 427° C. (800° F.) and about 524° C. (975° F.) AEBP as determined by any standard gas chromatographic simulated distillation method such as ASTM D2887, D6352 or D7169, all of which are used by the petroleum industry.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, "mesophasic material" means a formation of second liquid phase that is not miscible with bulk liquid, which can be measured using a microscopic technique according to ASTM 4616.

The term "$C_x$" are to be understood to refer to molecules having the number of carbon atoms represented by the subscript "x". Similarly, the term "$C_{x-}$" refers to molecules that contain less than or equal to x and preferably x and less carbon atoms. The term "$C_{x+}$" refers to molecules with more than or equal to x and preferably x and more carbon atoms.

The term "soft pitch" is generally understood to refer to heavy hydrocarbon material that boils in the range of 524° C. (975° F.) to about 704° C. (1300° F.). Soft pitch boils at a T5 between about 524° C. and about 565° C. and at T90 between about 640° C. and about 704° C.

The term "hard pitch" is generally understood to refer to heavy hydrocarbon material that boils in the range of higher than about 704° C. (1300° F.). Hard pitch boils at a T5 of greater than about 704° C. Hard pitch also has a greater density, a greater concentration of Conradson carbon and asphaltenes and a greater carbon-to-hydrogen ratio than soft pitch.

DETAILED DESCRIPTION

We have found that recycle of soft pitch to the SHC reactor is beneficial to SHC reactor operation. Soft pitch boils in the range of 524° C. (975° F.) to about 704° C. (1300° F.). Soft pitch excludes VGO which typically boils below 524° C. Cleaner exclusion of VGO from the recycle loop, results in less vaporization of feed in the SHC reactor enabling a reduction in reactor volume and recycle transport capacity. The soft pitch also excludes hard pitch material boiling above 704° C. that does not convert, so its recycle through the reactor similarly provides no benefit. Hard pitch predominantly includes Conradson carbon and asphaltenes which are insoluble in heptane. Hard pitch features fused aromatic structures with a high degree of hydrogen deficiency. It is difficult to further convert hard pitch to lower boiling point products, and hard pitch directly contributes to coke formation upon further processing. It has been discovered that selective rejection of a small hard pitch stream improves slurry hydrocracking conversion in terms of design and operation. The benefit is greater when targeting high conversion in which the hard pitch is the most resistant fraction for cracking reactions, e.g., at 90% pitch conversion or greater. A fractionator is commonly limited to separation capability at boiling points of about 524° C. Hard pitch cannot be separated from soft pitch in a fractionation column.

We have discovered that use of a settler to separate the hard pitch from soft pitch and VGO provides for a soft pitch stream lower in hard pitch concentration for recycle to the SHC reactor. Further solvent settling of the soft pitch and VGO stream to separate soft pitch from hard pitch can provide for recycle of a more highly concentrated soft pitch stream to the SHC reactor. Use of a poor solvent stream to cause a stream of the least soluble pitch to precipitate upon contact and separate from the rest of pitch material and VGO enriched streams in the settler and use of an additional poor solvent stream to precipitate more hard pitch out of the rest of pitch in an additional solvent settler enables production of a highly concentrated soft pitch stream for recycle to the SHC reactor or for producing a fuel stream.

The embodiments herein can be applicable to any hydroprocessing apparatus or process that recycles pitch to the reactor. SHC is one such hydroprocessing apparatus and process, so the description will be directed to a SHC unit although the application is not so limited.

The apparatus and process 10 involves a hydroprocessing section 10, a separation section 20 and a fractionation section 100. The hydroprocessing section 10 can include one single SHC reactor 12 but it may include at least two SHC reactors 12 in series. A hydrocarbon feed stream in feed line 14 may be mixed with a catalyst stream from catalyst line 16 and heated and charged to the SHC reactor 12 in charge line 15. A recycle stream in recycle line 124 comprising predominantly soft pitch may be mixed with the hydrocarbon feed stream in the charge line 15 that is charged to the SHC reactor 12. If more than one SHC reactor 12 is used, the recycle stream in recycle line 124 may be recycled to one of the downstream SHC reactors rather than the lead SHC reactor 12. A hydrogen stream from a hydrogen line 18 may also be heated and charged to the SHC reactor 12. Make-up hydrogen may be provided in a make-up line 19 to supplement the hydrogen line 18.

Generally, the SHC reactor section 12 can comprise of one or more reactors e.g., two or three reactors in series that operate at any suitable conditions, such as a temperature of about 400° C. (752° F.) to about 500° C. (932° F.) and a pressure of about 10 to about 24 MPa. Exemplary slurry hydrocracking reactors are disclosed in, e.g., U.S. Pat. Nos. 5,755,955; 5,474,977; US 2009/0127161; US 2010/0248946; US 2011/0306490; and US 2011/0303580. Often, slurry hydrocracking is carried out using reactor conditions sufficient to crack at least a portion of a hydrocarbon feed 14 to lower boiling products, such as gas oil, diesel, naphtha, and/or $C_1$-$C_4$ products. The hydrocarbon feed stream in feed line 14 can include a stream of hydrocarbons boiling from about 340° C. (644° F.) to about 570° C. (1058° F.), atmospheric residue, vacuum residue, visbreaker bottoms, solvent deasphalted pitch, tar, bitumen, coal oil, and shale oil. The catalyst stream in the catalyst line 16 may be combined with the hydrocarbon feed stream in feed line 14 to obtain a solids content of about 0.01 to about 10 wt %. Hydrogen may be separately fed to the SHC reactor 12 or added to the reactor with the feed stream. More than one SHC reactor 12 may be used with interstage separation between reactors. Overall pitch conversion may be at least 70%, typically at least 85%, suitably at least 90% and preferably at least 95%.

Typically, the slurry catalyst composition can include a catalytically effective amount of one or more compounds including iron and/or molybdenum. Particularly, the one or more compounds can include at least molybdenum in hydrocarbon, on carbon or on a support or one of an iron oxide, an iron sulfate, and an iron carbonate. Alternatively, the one or more compounds can include at least one of an iron oxide, an iron sulfate, and an iron carbonate. Other forms of iron can include at least one of an iron sulfide, a pyrrhotite, and a pyrite. What is more, one or more catalyst particles can include about 2 to about 45 wt % iron oxide and about 20 to about 90 wt % alumina such as bauxite. Alternatively, the catalyst can contain materials other than an iron, such as at least one of molybdenum, nickel, cobalt and manganese, and/or a salt, an oxide, and/or a mineral thereof. In another exemplary embodiment, it may be desirable for the catalyst to be supported. As a consequence, such a catalyst can include a support of alumina, silica, titania, one or more aluminosilicates, magnesia, bauxite, coal and/or petroleum coke. Such a supported catalyst can include a catalytically active metal, such as at least one of iron, molybdenum, nickel, cobalt and vanadium, as well as sulfides of one or more of these metals. Generally, supported catalyst can have about 0.01 to about 30 wt % of the catalytic active metal based on the total weight of the catalyst.

A slurry hydrocracked effluent stream exits the SHC reactor in an effluent line 22 and is fed to the separation section 20. Generally, a hydrocracked effluent stream in effluent line 22 from the SHC reactor 12 may or may not be quenched with cool hydrogen. The separation section 20 can include several separators. The hydrocracked effluent stream is fed by the effluent line 22 to a hot high pressure separator 24 which is in downstream communication with the SHC reactor 12. The hot high pressure separator 24 separates the hydrocracked effluent stream in the effluent line 22 at high pressure to provide a hot vapor stream in a hot overhead line 26 extending from a top of the hot high pressure separator 24 and a hot liquid stream in a hot bottoms line 28 extending from a bottom of the hot high pressure separator. The hot high pressure separator 24 is operated at about the same pressure and similar to or lower than the temperature of the SHC reactor 12. The hot high pressure separator 24 may be operated at pressures between about 9 MPa (g) (1305 psig) and about 22 MPa (g) (3190 psig).

The hot liquid stream in the hot bottoms line 28 may be let down in pressure to concentrate the unconverted pitch and delivered to a hot flash drum 30 which is in downstream communication with the SHC reactor 12 and the hot high pressure separator 24. The hot flash drum 36 separates the hot liquid stream in the hot bottoms line 28 to provide a hot flash vapor stream in a hot flash overhead line 32 extending from a top of the hot flash drum 30 and a hot flash liquid heavy stream in a hot flash bottoms line 34 extending from a bottom of the hot flash drum 30. The heavy stream includes a predominance of the pitch in the hydrocracked effluent stream in the effluent line 22. The hot flash drum 30 is operated at a temperature of about the same as the hot high pressure separator of between about 200° and about 500° C. and a pressure of between about 0.3 MPa (g) (44 psig) and about 7 MPa (g) (1015 psig).

The hot vapor stream in the hot overhead line 26 may be hydrated by a water line 25, cooled and separated in a cold high pressure separator 56. The cold high pressure separator 56 separates the hot vapor stream to provide a cold vapor stream comprising a hydrogen-rich gas stream in a cold overhead line 58 extending from a top of the cold high pressure separator 56 and a cold liquid stream in a cold bottoms line 60 extending from a bottom of the cold high pressure separator 56. The cold high pressure separator 56 serves to separate hydrogen-rich gas from hydrocarbon liquid in the hot vapor stream for recycle to the SHC reactor 12 in the cold overhead line 58. The hydrogen-rich gas in the cold vapor stream may be recycled to the SHC reactor 12 in the hydrogen line 18 perhaps after hydrogen purification and compression and supplementation with make-up hydrogen from make-up hydrogen line 19. The cold high pressure separator 56, therefore, is in downstream communication with the hot overhead line 26, the hot separator 24 and the SHC reactor 12.

The cold high pressure separator 56 may be operated at about 100° F. (38° C.) to about 150° F. (66° C.), suitably about 115° F. (46° C.) to about 145° F. (63° C.), and just below the pressure of the SHC reactor 12 accounting for pressure drop through intervening equipment to keep hydrogen and light gases in the cold overhead line 58 and normally liquid hydrocarbons in the cold bottoms line 60. The cold high pressure separator 56 may be operated at pressures between about 10 MPa (g) (1,450 psig) and about 24 MPa (g) (3,480 psig). The cold high pressure separator 56 may also have a boot for collecting an aqueous phase. The cold liquid stream in the cold bottoms line 60 may have a temperature of the operating temperature of the cold high pressure separator 56.

In an aspect, the cold liquid stream in the cold bottoms line 60 may be let down in pressure and flashed in a cold flash drum 62 to separate the cold liquid stream in the cold bottoms line 60. The cold flash drum 62 may be in direct, downstream communication with the cold bottoms line 60 of the cold high pressure separator 56 and in downstream communication with the SHC reactor 12. In a further aspect, the hot flash vapor stream in the hot flash overhead line 32 may be hydrated with water from a water line 33, cooled and flashed in the cold flash drum 62 to separate the hot flash vapor stream in the hot flash overhead line 32. The cold flash drum 62 may be in direct, downstream communication with the hot flash overhead line 32 of the hot flash drum 30 and in downstream communication with the SHC reactor 12. The cold flash drum 62 may separate the cold liquid stream in the cold bottoms line 60 and the hot flash vapor stream in the hot flash overhead line 32 to provide a cold flash vapor stream in a cold flash overhead line 64 extending from a top of the cold flash drum 62 and the cold flash liquid stream comprising a cold hydrocracked stream in the cold flash bottoms line 66 extending from a bottom of the cold flash drum. The cold flash vapor stream in the cold flash overhead line 64 is concentrated in hydrogen sulfide and hydrogen. The cold flash vapor stream may be further treated to recover hydrogen such as by stripping or scrubbing.

The cold flash drum 62 may be in downstream communication with the cold high pressure separator 56, the hot overhead line 26, the hot high pressure separator 24, the hot flash drum 30 and the SHC reactor 12. The cold flash drum 62 may be operated at the same temperature as the cold high pressure separator 56 but typically at a lower pressure of between about 0.3 MPa (g) (44 psig) and about 6.9 MPa (g) (1000 psig) and preferably between about 1 MPa (g) (145 psig) and about 3.8 MPa (g) (550 psig). A flashed aqueous stream may be removed from a boot in the cold flash drum 62. The cold hydrocracked stream in the cold flash bottoms line 66 may have the same temperature as the operating temperature of the cold flash drum 62.

The cold hydrocracked stream in the cold flash bottoms line 66 may be provided to the fractionation section 100. The fractionation section 100 may comprise a product fractionation column 110, a main fractionation column 130 and a debutanizer column 150. The cold hydrocracked stream in the cold flash bottoms line 66 can be provided to the main fractionation column 130.

A heater may heat the cold hydrocracked stream in the cold flash bottoms line 66 before it enters the main fractionation column 130. The main fractionation column 130 may be in downstream communication with the cold flash bottoms line 66. In an aspect, the cold hydrocracked stream in the cold flash bottoms line 66 need not be stripped with an inert gas before entering the main fractionation column 130.

The main fractionation column 130 may strip the cold hydrocracked stream with an inert stripping media such as steam from line 132 to vaporize the cold hydrocracked stream to fractionate and provide several product streams. An overhead stream in a fractionator overhead line 131 may be condensed and fed to a receiver 133 which produces a main net gas stream in a main net gas line 134 extending from a top of the receiver and an overhead liquid stream taken from a receiver bottoms line extending from a bottom of the receiver 133. The overhead liquid stream may be split between a main net overhead liquid stream comprising predominantly light diesel in a main net overhead liquid line 136 and a reflux liquid stream returned to the column in a reflux line. A sour water stream may be taken from a boot from the receiver 133. A main product stream may be taken from a side of the main fractionation column 130 comprising predominantly heavy diesel stream from a side cut outlet in a main line 140. A main bottoms stream comprising predominantly VGO may be taken from a main bottoms outlet from the main fractionation column 130 in a main bottoms line 148. The main fractionation column 130 is operated at slightly atmospheric pressure such as about 14 kPa (g) (2 psig) to about 345 kPa (g) (50 psig) and a temperature of about 148 to about 287° C. Heat may be removed from the main fractionation column 130 by cooling the main stream taken from a side outlet in the side main line 140 and returning a portion of the cooled stream back to the column.

The main net gas stream in the main net gas line 134 may be stripped in the debutanizer column 150 with an inert stripping gas such as steam from stripping line 152. The debutanizer column 150 may fractionate the main net gas stream to provide product streams. An overhead stream in a debutanizer overhead line 151 may be condensed and fed to a receiver 153 which produces a light gas stream in an off-gas line 154 extending from a top of the receiver and an overhead liquid stream taken in a receiver bottoms line extending from a bottom of the receiver 153. The overhead liquid stream may be split between a debutanizer net liquid stream comprising predominantly liquefied petroleum gas in a debutanizer net overhead liquid line 156 and a reflux liquid stream returned to the column in a reflux line. A sour water stream may be taken from a boot from the receiver 153. A debutanized stream comprising predominantly naphtha may be produced in a debutanized bottoms line 158. In an aspect, the debutanizer column 150 may be operated at about 137.8 kPa (g) (20 psig) to about 1378 kPa (g) (200 psig) and a temperature of about 20 to about 80° C.

The heavy stream in the hot flash bottoms line 34 comprises the predominance of the unconverted pitch and catalyst particles from the hydrocracked effluent stream in the effluent line 22. It is desired to separate distillate and lighter VGO from the pitch. In an aspect, the heavy stream in the hot flash bottoms line 34 is mixed with a first solvent stream in a first solvent line 44 in a first mixing column 40 to provide a first hydrocracked product stream in a first mixer overhead line 42 and a first hard pitch stream in a first mixer bottoms line 46. The first mixing column 40 may be in downstream communication with the SHC reactor 12, the hot separator 24, and the hot flash drum 30.

The first solvent is preferably a poor solvent that precipitates the least soluble pitch to form aggregates in a form of a second liquid or a semi-solid phase. Inorganic solids tend to associate with the precipitates to form a higher density pitch stream and fall out of solution. The first solvent may be selected from one or more of the following solvents: naphtha, kerosene, light diesel, and paraffins comprising: propane, butane, pentane, hexane, n-heptane, n-octane, isooctane and decane. In an embodiment, the solvent may have a solubility parameter of about 7 to about 8.5 $cal^{1/2}$ $cm^{-3/2}$ to perform as a poor solvent when mixed with the slurry hydrocracked heavy stream in the hot flash bottoms line 34. In an aspect, the first solvent in the first solvent line 44 is fed to a lower half of the mixing column 40 through a first solvent inlet 44i and the heavy stream in the hot flash bottoms line 34 is fed to an upper half of the mixing column 40 through a heavy inlet 34i located above the solvent inlet 44i. In an embodiment, the first solvent and the heavy stream are counter-currently contacted in the mixing column 40 which may be equipped with internal trays or packing to increase contacting surface area at a settling velocity and contact time that allows the pitch to precipitate out of solution and gravitate and settle to a bottom of the first mixing column 40 and product hydrocarbons to rise with the first solvent to the top of the first mixing column. Control of the initial settling velocity may be adjusted through solvent type, the solvent addition rate, the temperature of the first solvent stream in the first solvent line 44, conditions in the hot separator 24 and the hot flash drum 30 and pitch conversion in the SHC reactor 12. The initial settling velocity of the precipitates in the first mixing column 40 may be about 40 cm/hr to about 1000 cm/hr. Settling velocity and liquid superficial velocity may be designed so that almost all inorganic solids fall down to the bottom of the first mixing column 40 and concentrate with hard pitch in the first mixer bottoms line 46. The first solvent stream in the first solvent line 44 is introduced at a lower temperature than the heavy stream in the hot flash bottoms line 34. The settler temperature is controlled by the solvent addition rate and the temperature of the first solvent stream in first solvent line 44. The temperature of the first mixing column 40 may be about 150° C. to about 450° C. and its pressure may be about 0.3 MPa (g) (44 psig) to about 5 MPa (g) (725 psig).

The mass ratio of the first solvent to the heavy stream is a process control parameter. The higher the ratio is, the higher the amount of precipitates it forms in the first mixing column 40. The mass ratio should be no more than 1 and is preferably less than 1 in the first mixing column 40. The mass ratio varies with the desired rejection rate of hard pitch, solvent type and temperature requirement. The hydrocracked product stream in the first mixer overhead line 42 has a predominance of the soft pitch from the heavy stream in the hot flash bottoms line 34 and the first hard pitch stream in the first mixer bottoms line 46 has a predominance of the hard pitch from the heavy stream in the hot flash bottoms line 34.

The first hydrocracked product stream in the first mixer overhead line 42 may be fed to a second mixing column 80 to further precipitate additional hard pitch out of the first hydrocracked product stream. The first hard pitch stream in the first mixer bottoms line 46 comprises the predominance of the least soluble organic, hard pitch, Conradson carbon and catalyst material from the hydrocracked effluent stream in the effluent line 22. If it is desired to have a cleaner separation of the heaviest hard pitch from the lighter soft pitch or lighter products that travels in the effluent line 22, the first hard pitch stream in the first mixer bottoms line 46 may be fed to an optional first concentrator 70. The first concentrator 70 may be in downstream communication with the first mixer bottoms line 46. The first concentrator 70 concentrates the first concentrator pitch stream by removing a hydrocracked liquid stream in a first concentrator liquid line 74 comprising solvent, VGO and soft pitch from the first pitch stream to leave a first concentrated pitch stream in a first concentrated pitch line 76. The first concentrated pitch stream comprises predominantly hard pitch and catalyst particles. The first hydrocracked liquid stream in the first concentrator liquid line 74 may be forwarded to the fractionation section 100 where it is fractionated.

The first concentrator 70 may comprise a filtration unit from which the hard pitch and catalyst particles of the first concentrated pitch stream in the first concentrated pitch line 76 is a filtration residue and the first hydrocracked liquid stream in the first concentrator liquid line 74 is the filtrate. In another embodiment, the first concentrator 70 may be a hydrocyclone which spins the first concentrator pitch stream in the first concentrator pitch line 70 by tangential entry into a cylindrical chamber in the hydrocyclone to provide centripetal separation as the first concentrated pitch stream rotationally travels around the inside of the hydrocyclone. The rotational travel separates denser catalyst and hard pitch in the first concentrated pitch stream in the first concentrated pitch line 76 extending from a bottom of the hydrocyclone from less dense liquid and soft pitch in the first hydrocracked liquid stream in the first concentrator liquid line 74 extending from a top of the hydrocyclone. Another example of the first concentrator 70 is a centrifugal separator which spins the first concentrator pitch stream in the first concentrator pitch line 70 in a revolving drum which has a perforated cylindrical wall to force liquid by centrifugal separation into an annulus outside of the drum which collects the liquid and soft pitch which are directed through the first hydrocracked liquid stream in the first concentrator liquid line 74. The centrifugal separator retains denser catalyst and hard pitch in the drum which are directed through the first concentrated pitch stream in the first concentrated pitch line 76 extending perhaps from a bottom of the centrifugal separator.

The first hydrocracked product stream in the first mixer overhead line 42 comprises residual hard pitch, soft pitch, VGO and solvent from the first mixing column 40. If it is desired to further reject additional hard pitch from the first hydrocracked product stream in the first mixer overhead line 42, all or a portion of the first hydrocracked product stream in the first mixer overhead line 42 may be mixed with a second solvent in a second solvent line 82 in a second mixing column 80 to provide a second hydrocracked product stream comprising soft pitch, VGO and the second solvent in a second mixer overhead line 84 and a second pitch stream comprising additional hard pitch in a second mixer bottoms line 86. The second mixing column 80 may be in downstream communication with the SHC reactor 12, the hot separator 24, the hot flash drum 30 and the first mixing column 40.

The second solvent is preferably a poor solvent that tends to precipitate the additional insoluble pitch to form aggregates in a form of a second liquid phase or a semi-solid phase. The aggregates form a higher density pitch stream and fall out of solution. The second solvent may be selected from one or more of the following solvents listed for the first solvent and may have a solubility parameter in the range of the first solvent or lower. The second solvent may be the same solvent as the first solvent. Solvent recovered from the first mixing column 40 in the first hydrocracked product stream in the first mixer overhead line 42 supplements the second solvent stream 82 to provide additional precipitation of hard pitch to separate it from lighter products.

In an aspect, the second solvent in the second solvent line 82 is fed to a lower half of the second mixing column 80 through a second solvent inlet 82i and the first hydrocracked product stream in the first mixer overhead line 42 is fed to an upper half of the second mixing column 80 through a first hydrocracked product inlet 42i located above the second solvent inlet 82i. In an embodiment, the second solvent and the first hydrocracked product stream are counter-currently contacted in the second mixing column 80 which may be equipped with internal trays or packing to increase contacting surface area at a settling velocity and contact time that allows the hard pitch to precipitate out of solution and gravitate and settle to a bottom of the second mixing column 80 and dissolved soft pitch to rise with the second solvent to the top of the second mixing column. Control of the initial settling velocity in the second mixing column 80 is adjusted by the type of second solvent, the second solvent addition rate in second solvent line 82, pitch conversion in the SHC reactor 12 as well as the efficiency of separation in the first mixing column 40. The initial settling velocity of the hard pitch aggregates in the second mixing column 80 may be about 40 cm/hr to about 1000 cm/hr. The second solvent temperature in the second solvent line 82 can be adjusted to control the temperature of the second mixing column 80. The temperature of the second mixing column 80 is controlled by the solvent addition rate and the temperature of the second solvent in the second solvent line 82. The temperature of the second mixing column 80 may be about 100° C. to about 400° C. and its pressure may be about 0.2 MPa (g) (29 psig) to about 5 MPa (g) (652 psig).

The mass ratio of the second solvent to the second hydrocracked product stream is a process control parameter. The higher the ratio is, the higher the amount of precipitates it forms in the second mixing column 80. The mass ratio of the second solvent to the second hydrocracked product stream should be no more than 1 and preferably less than 1 in the second mixing column 80. The mass ratio of the second solvent to the first hydrocracked product stream varies with the desired hard pitch rejection rate, efficiency of the first mixing column 40, the second solvent type and temperature control requirements. The mass ratio serves to ensure hard pitch range hydrocarbons settle out of the pitch stream and gravitate to the bottom of the second mixing column 80. The second hydrocracked product stream in the second mixer overhead line 84 has a predominance of the soft pitch from the first hydrocracked product stream in the first mixer overhead line 42 and the second pitch stream in the second mixer bottoms line 86 has a predominance of the hard pitch from the first hydrocracked product stream in the first mixer overhead line.

The first hard pitch stream in the first mixer bottoms line 46 may be heavier than the second pitch stream in the second mixer bottoms line 86 in terms of its carbon-to-hydrogen ratio, Conradson carbon concentration and density. The first hydrocracked product stream in the first mixer overhead line 42 and the second hydrocracked product stream in the second mixer overhead line 84 may comprise a mixture of solvent, hydrocracked products and soft pitch that has lower carbon-to-hydrogen ratio, Conradson carbon and asphaltene concentration and density than the first hard pitch stream in the first mixer bottoms line 46 and the second pitch stream in the second mixer bottoms line 86, respectively.

The second hydrocracked product stream in the second mixer overhead line 84 may be fed to a product fractionation column 110 in the fractionation section 100. The product fractionation column 110 may be in downstream communication with the SHC reactor 12, the hot separator 24, the hot flash drum 30, the first mixing column 40, the second mixing column 80, the first concentrator 72 and the second concentrator 90. Specifically, the product fractionation column 110 may be in downstream communication with the first mixer overhead line 42 extending from a top of the first mixing column 40 and/or with the second mixer overhead line 84 extending from a top of the second mixing column 80.

The second pitch stream in the second mixer bottoms line 86 may be fed to a second concentrator 90. The second concentrator 90 is in downstream communication with the second mixer bottoms line 86. The second concentrator 90 concentrates the hard pitch in the second pitch stream by removing a second hydrocracked liquid stream in a second concentrator liquid line 92 comprising soft pitch, VGO and solvent from the second pitch stream to leave a concentrated hard pitch stream in a second concentrated pitch stream in a second concentrated pitch line 94. The second concentrated pitch stream comprises predominantly hard pitch. The second hydrocracked liquid stream in the second concentrator liquid line 92 may be forwarded to the fractionation section 100 where it is fractionated. The second hydrocracked liquid stream in the second concentrator liquid line 92 may be transported to the fractionation section 100 along with the first hydrocracked liquid stream in the first concentrator liquid line 74.

The second concentrator 90 may comprise a filtration unit from which the hard pitch of the second concentrated pitch stream in the second concentrated pitch line 94 is a filtration residue and the second concentrator liquid stream in the second concentrator liquid line 92 is the filtrate. In another embodiment, the second concentrator 90 may be a hydrocyclone which spins the soft pitch stream in the second mixer bottoms line 86 by tangential entry into a cylindrical chamber in the hydrocyclone to provide centripetal separation as the second concentrator liquid stream rotationally travels around the inside of the hydrocyclone. The rotational travel separates hard pitch in the second concentrated pitch stream in the second concentrated pitch line 94 extending from a bottom of the hydrocyclone from less dense liquid and soft pitch in the second hydrocracked liquid stream in the second concentrator liquid line 92 extending from a top of the hydrocyclone. Another example of the second concentrator 90 is a centrifugal separator which spins the second pitch stream in the second concentrator pitch line 86 in a revolving drum which has a perforated cylindrical wall to force liquid by centrifugal separation into an annulus outside of the drum which collects the liquid and soft pitch which are directed through the second hydrocracked liquid stream in the second concentrator liquid line 92. The centrifugal separator retains hard pitch in the drum which are directed through the second concentrated pitch stream in the second concentrated pitch line 94 extending perhaps from a bottom of the centrifugal separator 90.

The first concentrated pitch stream in the first concentrated pitch line 76 may be heavier than the second concentrated pitch stream in the second concentrated pitch line 94 in terms of its carbon-to-hydrogen ratio, Conradson concentration and density. The first hydrocracked product stream in the first mixer overhead line 42 and the second hydrocracked product stream in the second mixer overhead line 84 may comprise a mixture of solvent, hydrocracked products and soft pitch that has lower carbon-to-hydrogen ratio, Conradson carbon and asphaltene concentration and density than the first concentrated pitch stream in the first concentrated pitch line 76 and the second concentrated pitch stream in the second concentrated pitch line 94, respectively.

In the fractionation section 100, a product fractionation column 110 may fractionate the heavy bottoms stream in the product fractionation bottoms line 148, the first hydrocracked product stream in the first mixer overhead line 42, if no second settler vessel 80 is used, the second hydrocracked product stream in the second mixer overhead line 84, the first hydrocracked liquid stream in the first concentrator liquid line 74, if used, and the second hydrocracked liquid stream in the second concentrator liquid line 92, if used. The inlet for the product fractionation bottoms line 148 may be at a location that is higher than the inlet for the first and second mixer overhead lines 42, not shown, and 84, which may be at a location that is higher than the location of the inlet for the first and second concentrator liquid lines 74 and 92. The product fractionation column 110 may strip the heavy bottoms stream, the first and/or second hydrocracked product streams and the first and second hydrocracked liquid streams with an inert stripping media such as steam from an inert gas line 112 to provide product streams. Because the hard pitch is removed upstream in the mixing columns 40, 80 and concentrators 72, 90, the fractionation is much more easily performed due to the reduction in volume, boiling point of the streams fed to the product fractionation column 110 and the reduced coking propensity. An overhead stream in a vacuum fractionator overhead line 111 may be condensed and fed to a receiver 113 which produces a product net gas stream in a product net gas line 114 extending from a top of the receiver and an overhead liquid stream taken from a receiver bottoms line extending from a bottom of the receiver 113. A vacuum may be pulled on the net gas line 114 to generate a vacuum in the vacuum fractionation column 110. The overhead liquid stream may be split between a net used solvent stream comprising predominantly used solvent in a net overhead solvent line 116 and a reflux liquid stream returned to the column in a reflux line. Due to the relatively lower boiling point of the used solvent stream, recovery of solvent in the product fractionation column 110 is fairly straight forward. A first product side stream comprising predominantly heavy diesel and/or LVGO may be taken in a first product side line 142 from a first side outlet, a second product side stream comprising predominantly HVGO may be taken in a second product side line 144 from a second side outlet and a products bottom stream in a product bottoms line 122 comprising predominantly soft pitch may be taken from a bottom of the product fractionation column 110. The soft pitch may boil between about 524° C. and about 704° C. Insubstantial hard pitch, such as less than 5 wt % and preferably less than 1 wt %, may be provided in the product bottoms line 122, because the hard pitch is removed in the mixing columns 40, 80. A portion of the soft pitch in the product bottoms stream in the product bottoms line 122 may be recovered and further processed or used as a product such as fuel or for asphalt. A recycle stream taken from the product bottoms line 122 comprising predominantly soft pitch may be recycled to the SHC reactor 12 in recycle line 124. The recycle stream of soft pitch in recycle line 124 is free of inorganic solids and TIOR. The recycle stream in recycle line 124 of soft pitch is significantly lower in carbon-to-hydrogen ratio, Conradson carbon and asphaltene concentration, and density than the first hard pitch stream in the first mixer bottoms line 46 and the second pitch stream in the second mixer bottoms line 86, upstream of the first concentrator 70 and the second concentrator 90, respectively. The recycle stream in recycle line 124 of soft pitch is significantly lower in carbon-to-hydrogen ratio, Conradson carbon and asphaltene concentration, and density than the first concentrated pitch stream in the first concentrated pitch line 76 and the second concentrated pitch stream in the second concentrated pitch line 94, downstream of the first concentrator 70 and the second concentrator 90, respectively. The soft pitch cracks much more easily than the hard pitch streams in lines 46, 76, 86 and 94.

A solvent recycle stream in line 118 taken from the net used solvent stream in a net overhead solvent line 116 may be recycled to the first mixing column 40 and the second mixing column 80. A first solvent recycle line 146 may take solvent from the solvent recycle line 118 to the first mixing column 40 with supplemental solvent added by supplemental solvent line 147 to provide the first solvent stream in the first solvent line 44. A second solvent recycle line 150 may take solvent from the solvent recycle line 118 to the second mixing column 80 with supplemental solvent added by supplemental solvent line 152 to provide the second solvent stream in the second solvent line 82. Solvent recycle, as shown, presumes that the same solvent is used as the first solvent stream and the second solvent stream. Accordingly, the supplemental solvent streams will be composed similarly to the first solvent stream and the second solvent stream.

In an aspect, the product fractionation column 110 may be operated as a vacuum column at a pressure between about 0.1 kPa (a) (1 torr (a)) and about 40 kPa (a) (300 torr (a)), preferably, between about 1.3 kPa (a) (10 torr (a)) and 13.3 kPa (a) (100 torr (a)). The vacuum distillation temperature may be maintained at between about 280° C. (536° F.) to about 335° C. (635° F.) and preferably between about 300° C. (572° F.) to about 315° C. (600° F.). Heat may be removed from the product fractionation column 110 by cooling the product side streams taken from the side cut outlets and returning a portion of the cooled stream back to the column.

EXAMPLES

Example 1

A Russian export straight run vacuum residue with 95 wt % boiling over 524° C. was deasphalted using n-butane solvent in a lab solvent deasphalting unit. About 63 wt % was recovered in a deasphalted oil and 37 wt % was left as an asphalt. The deasphalted oil contained 78 wt % material with boiling point in the soft pitch range of 524° C. (975° F.) to 704° C. (1300° F.) and 10 wt % in the hard pitch range boiling above 704° C. (1300° F.). The asphalt stream contained 36 wt-% material boiling in the soft pitch range and 63 wt % boiling in the hard pitch range.

Hence, the feasibility of using solvent to separate a straight run pitch into predominantly soft pitch and predominantly hard pitch streams. Conradson carbon was distributed as 7.5 wt % in the deasphalted oil stream and 41.2 wt % in the asphalt stream. Out of a simple Conradson balance, 23 wt % is located in deasphalted oil and 77 wt % is located in asphalt stream. N-heptane insolubles is 1 wt % in the deasphalted oil stream and 32 wt % in the asphalt stream. Out of a simple n-heptane mass balance, 95 wt % of n-heptane insolubles are distributed in the asphalt stream.

Example 2

The same Russian export straight run vacuum residue from Example 1 was SHC in a 1000 cc lab autoclave reactor with an iron sulfate monohydrate catalyst, equivalent to 3 wt % iron on the basis of VR feed, and 60 grams of added elemental sulfur. The reactor was quickly heated to 450° C. and held for 80 minutes under 2000 psig hydrogen environment with a continuous hydrogen flow through. The reactor cooled down quickly after the holding time. Final pitch conversion was 81%. The pseudo first order cracking rate constant using the equation of $-1*\ln(1-\text{pitch conversion})/$ holding time was 1.25 l/hr.

Example 3

The asphalt stream from the deasphalting operation of Example 1 was slurry hydrocracked in the same way as in Example 2. Final pitch conversion was 50%. The same cracking rate constant was calculated as $-1*\ln(1-\text{pitch conversion})/$holding time to be about 0.52 l/hr. Comparison of Example 2 and Example 3 demonstrates the cracking activity is much reduced for the asphaltene fraction containing predominantly hard pitch and which contains the predominance of Conradson carbon and the n-heptane insolubles. Hence, selective rejection of hard pitch contained the predominance of Conradson carbon and the n-heptane insolubles.

Example 4

A SHC heavy product stream was taken from a hot separator bottoms line. The SHC heavy product resulted from 80% pitch conversion and contained 32 wt % unconverted pitch by GC simulated distillation. The product was solvent deasphalted using butane to obtain an asphalt stream comprising 11.3 wt % of the SHC heavy product stream, which comprises 100% pitch by GC simulated distillation. The SHC heavy product had 8.6 wt % pentane insolubles. The asphalt stream contained 80 wt % pentane insolubles, so all of the pentane insolubles were in the asphalt stream.

Hence, a hard pitch stream can be isolated from a SHC product stream which accounts for 35 wt % of the pitch fraction in the total unconverted material (11.3/32). The isolated asphalt stream contains almost all pentane insoluble by a simple mass balance.

Example 5

A SHC product comprising unconverted pitch was titrated in a lab apparatus. The SHC product sample comprising 0.5 grams was diluted in 2 ml of toluene. Continuous titration of the toluene-diluted sample with isooctane achieved flocculation of insoluble materials solution as soon as titration began. After the onset of flocculation, continuously adding isooctane progressively increased amount of pitch flocculated. The rate of flocculation was highest in the beginning.

Specific Embodiments

While the following is described in conjunction with specific embodiments, it will be understood that this description is intended to illustrate and not limit the scope of the preceding description and the appended claims.

A first embodiment of the invention is a process for slurry hydrocracking comprising slurry hydrocracking a hydrocarbon feed stream in a slurry hydrocracking reactor to provide a hydrocracked effluent stream; separating a hydrocracked stream, taken from the hydrocracked effluent stream, to provide a heavy stream; mixing the heavy stream with a solvent to provide a hydrocracked product stream and a first hard pitch stream; and fractionating the hydrocracked product stream. An embodiment of the invention is one, any or all of prior embodiments in this paragraph up through the first embodiment in this paragraph further comprising separating a used solvent stream from the hydrocracked product stream in the fractionation step. An embodiment of the invention is one, any or all of prior embodiments in this paragraph up through the first embodiment in this paragraph wherein mixing the heavy stream with the solvent stream comprises counter-currently contacting the heavy stream with the solvent. An embodiment of the invention is one, any or all of prior embodiments in this paragraph up through the first embodiment in this paragraph wherein mixing the heavy stream with the solvent stream comprises allowing the first hard pitch stream to settle to a bottom of a mixing vessel while the hydrocracked product stream rises to a top of the mixing column. An embodiment of the invention is one, any or all of prior embodiments in this paragraph up through the first embodiment in this paragraph wherein the mass ratio of the solvent to heavy stream is no more than 1. An embodiment of the invention is one, any or all of prior embodiments in this paragraph up through the first embodiment in this paragraph further comprising mixing the hydrocracked product stream with another solvent stream to provide a second hydrocracked product stream comprising soft pitch and a second hard pitch stream. An embodiment of the invention is one, any or all of prior embodiments in this paragraph up through the first embodiment in this paragraph further comprising fractionating the soft pitch stream to provide a soft pitch product stream. An embodiment of the invention is one, any or all of prior embodiments in this paragraph up through the first embodiment in this paragraph further comprising recycling the soft pitch product stream to the hydrocracking step. An embodiment of the invention is one, any or all of prior embodiments in this paragraph up through the first embodiment in this paragraph wherein the fractionation step further comprises providing a solvent stream and recycling the solvent stream to the mixing step. An embodiment of the invention is one, any or all of prior embodiments in this paragraph up through the first embodiment in this paragraph further comprising concentrating the first hard pitch stream by removing a hydrocracked liquid stream from the first hard pitch stream and fractionating the hydrocracked liquid stream. An embodiment of the invention is one, any or all of prior embodiments in this paragraph up through the first embodiment in this paragraph wherein the hydrocracked product stream has a predominance of the soft pitch from the heavy stream and the first hard pitch stream has a predominance of the hard pitch from the heavy stream.

A second embodiment of the invention is an apparatus for slurry hydrocracking comprising a slurry hydrocracking reactor; a separator in downstream communication with the slurry hydrocracking reactor; a mixing column in downstream communication with the separator; and a fractionation column in downstream communication with the mixing column. An embodiment of the invention is one, any or all of prior embodiments in this paragraph up through the second embodiment in this paragraph wherein the fractionation column is in downstream communication with an overhead line extending from a top of the mixing column. An embodiment of the invention is one, any or all of prior embodiments in this paragraph up through the second embodiment in this paragraph wherein the mixing column is in communication with the separator at a heavy inlet that is above an inlet for a solvent. An embodiment of the invention is one, any or all of prior embodiments in this paragraph up through the second embodiment in this paragraph further comprising another mixing column in downstream communication with the mixing column. An embodiment of the invention is one, any or all of prior embodiments in this paragraph up through the second embodiment in this paragraph further comprising a concentrator in communication with a bottoms line of the mixing column and a fractionation column is in downstream communication with the concentrator.

A third embodiment of the invention is a process for slurry hydrocracking comprising slurry hydrocracking a hydrocarbon feed stream in a slurry hydrocracking reactor to provide a hydrocracked effluent stream; separating a hydrocracked stream, taken from the hydrocracked effluent stream, to provide a heavy stream; recycling a soft pitch stream taken from the heavy stream to the slurry hydrocracking step, the soft pitch stream boiling between about 524° C. and about 704° C. An embodiment of the invention is one, any or all of prior embodiments in this paragraph up through the third embodiment in this paragraph further comprising mixing the heavy stream with a solvent stream to provide a hydrocracked product stream and a first hard pitch stream and mixing the hydrocracked product stream with a second solvent stream to provide the second soft pitch stream and a second hard pitch stream. An embodiment of the invention is one, any or all of prior embodiments in this paragraph up through the third embodiment in this paragraph further comprising fractionating the second soft pitch stream to provide a used solvent stream and a product stream. An embodiment of the invention is one, any or all of prior embodiments in this paragraph up through the third embodiment in this paragraph wherein the mass ratio of the solvent stream to the heavy stream is no more than 1.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for slurry hydrocracking comprising:
   slurry hydrocracking a hydrocarbon feed stream in a slurry hydrocracking reactor to provide a hydrocracked effluent stream;
   separating a hydrocracked stream, taken from said hydrocracked effluent stream, to provide a heavy stream;
   mixing the heavy stream with a solvent to provide a hydrocracked product stream and a first hard pitch stream; and
   fractionating said hydrocracked product stream in a fractionation column to provide a soft pitch stream and a gas oil stream; and
   recycling said soft pitch stream to said hydrocracking step.

2. The process of claim 1 further comprising separating a used solvent stream from said hydrocracked product stream in said fractionation step.

3. The process of claim 2 wherein mixing the heavy stream with the solvent stream comprises counter-currently contacting the heavy stream with the solvent.

4. The process of claim 3 wherein mixing the heavy stream with the solvent stream comprises allowing the first hard pitch stream to settle to a bottom of a mixing vessel while the hydrocracked product stream rises to a top of the mixing column.

5. The process of claim 1 wherein the mass ratio of the solvent to heavy stream is no more than 1.

6. The process of claim 1 further comprising mixing said hydrocracked product stream with another solvent stream to provide a second hydrocracked product stream comprising soft pitch and a second hard pitch stream.

7. The process of claim 6 further comprising fractionating said second hydrocracked product stream to provide said soft pitch stream.

8. The process of claim 1 wherein said fractionation step further comprises providing a solvent stream and recycling said solvent stream to said mixing step.

9. The process of claim 1 further comprising concentrating said first hard pitch stream by removing a hydrocracked liquid stream from said first hard pitch stream and fractionating the hydrocracked liquid stream.

10. The process of claim 1 wherein said hydrocracked product stream has a predominance of soft pitch from the heavy stream and the first hard pitch stream has a predominance of hard pitch from the heavy stream.

11. A process for slurry hydrocracking comprising:
slurry hydrocracking a hydrocarbon feed stream in a slurry hydrocracking reactor to provide a hydrocracked effluent stream;
separating a hydrocracked stream, taken from said hydrocracked effluent stream, to provide a heavy stream;
mixing the heavy stream with a solvent stream to provide a hydrocracked product stream and a hard pitch stream;
fractionating the hydrocracked product stream in a fractionation column to provide a soft pitch stream and a gas oil stream; and
recycling said soft pitch stream taken from said heavy stream to said slurry hydrocracking step, said soft pitch stream boiling between about 524° C. and about 704° C., wherein said soft pitch has a T90 between about 640° C. and about 704° C.

12. The process of claim 11 further comprising mixing the hydrocracked product stream with a second solvent stream to provide said second soft pitch stream and a second hard pitch stream.

13. The process of claim 12 further comprising fractionating said second soft pitch stream to provide a used solvent stream and a product stream.

14. The process of claim 11 wherein the mass ratio of the solvent stream to the heavy stream is no more than 1.

* * * * *